Patented Dec. 16, 1952

2,622,110

UNITED STATES PATENT OFFICE 2,622,110

PRODUCTION OF DI(CYCLOALKYL) ALKANES

Vladimir N. Ipatieff and Herman Pines, Chicago, Ill., assignors to Universal Oil Products Company, Chicago, Ill., a corporation of Delaware No Drawing. Application February 28, 1950, Serial No. 146,926

11 Claims. (Cl. 260—666)

This invention relates to a process for producing di(cycloalkyl)alkanes and particularly for producing di(cyclohexyl)alkanes.

An object of this invention is the production of a di(cycloalkyl)alkane.

Another object of this invention is the production of a di(cyclohexyl)alkane hydrocarbon.

A further object of this invention is the production of a di(alkylcyclohexyl)alkane.

A still further object of this invention is the production of a 1,1-di(alkylcyclohexyl)alkane.

Additional objects of this invention are the production of 1-(2-methyl-5-cyclohexyl)-1-(2-methyl-5-ethylcyclohexyl)-ethane and of 1-(2-methyl-5-cyclohexyl)-1-(2-methyl-5-n-propylcyclohexyl)-propane.

One specific embodiment of this invention relates to a process for producing a di(cycloalkyl)-alkane hydrocarbon which comprises reacting at hydrogen transfer conditions in the presence of an alkylation catalyst a branched-chain olefin and an aromatic hydrocarbon having two hydrocarbon group substituents in para positions to each other and in which at least one of said groups has only two hydrogen atoms combined with the carbon atom that is joined to the aromatic ring and a replaceable nuclear hydrogen atom is combined with a carbon atom adjacent to said carbon atom combined with the two hydrogen atoms to produce a diarylalkane, and hydrogenating said diarylalkane to form a di(cycloalkyl)alkane hydrocarbon.

Another embodiment of this invention relates to a process for producing a di(cycloalkyl)alkane hydrocarbon which comprises reacting at hydrogen transfer conditions in the presence of an acid-acting alkylating catalyst a branched-chain olefin and an aromatic hydrocarbon having two hydrocarbon group substituents in para positions to each other and in which at least one of said groups has only two hydrogen atoms combined with the carbon atom that is joined to the aromatic ring and a replaceable nuclear hydrogen atom is combined with a carbon atom adjacent to said carbon atom combined with the two hydrogen atoms to produce a diarylalkane, and hydrogenating said diarylalkane to form a di(cycloalkyl)alkane hydrocarbon.

A further embodiment of this invention relates to a process for producing a di(cyclohexyl)-alkane hydrocarbon which comprises reacting at hydrogen transfer conditions in the presence of an acid-acting alkylating catalyst a branched-chain olefin and a benzene hydrocarbon of the formula

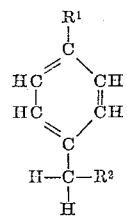

wherein each of $R^1$ and $R^2$ is selected from the group consisting of an alkyl radical, a cycloalkyl radical, a cycloalkylkyl radical and a bicycloalkyl radical. By the term "cycloalkalkyl" is meant a hydrocarbon radical in which a cycloalkyl group replaces a hydrogen atom of an alkyl group. A cycloalkyl radical is thus a cycloalkyl derivative of an alkyl radical.

We have developed a method of producing di(cycloalkyl)alkane hydrocarbons and particularly for producing di(cyclohexyl)alkane hydrocarbons by a combination of hydrogen transfer and hydrogenation reactions. The hydrogen transfer reaction is effected in the presence of an acid-acting alkylating catalyst between a branched-chain olefinic hydrocarbon and an aromatic hydrocarbon containing at least two and generally not more than five hydrocarbon radical substituents with two of these substituents in para positions. Also at least one of said para substituents has two and only two hydrogen atoms combined with the carbon atom that is joined to the aromatic ring. A further requirement for such a hydrogen transfer reaction is that an aromatic hydrocarbon be present which has a replaceable hydrogen atom combined with a nuclear carbon atom that is adjacent to the carbon atom of the alkyl group in para position to another alkyl group and containing only two hydrogen atoms.

The hydrogen transfer step of this process is illustrated by the following equation wherein $x$ is selected from 0 and the small even numbers 2, 4, 6, etc.

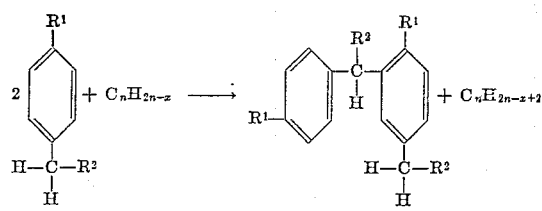

In the above-indicated equation each of $R^1$ and $R^2$ represents a member of the group consisting of an alkyl group, a cycloalkyl group, a cycloalkalkyl group and a bicycloalkyl group.

Hydrogenation of the substituted diphenylalkanes referred to in the foregoing equation produces di(alkylcyclohexyl)alkanes which may be represented by the formula:

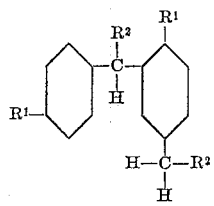

wherein $R^1$ and $R^2$ represent the same groups indicated in the substituted diphenylalkanes. In such di(alkylcyclohexyl)alkane hydrocarbons one of the cyclohexyl groups has one more alkyl substituent than the other cyclohexyl group.

Similarly, by means of the hydrogen transfer reaction the production of 1-tolyl-1-(2-methyl-5-ethylphenyl)ethane from 1-methyl-4-ethylbenzene and methylcyclohexene may be illustrated by the following equation:

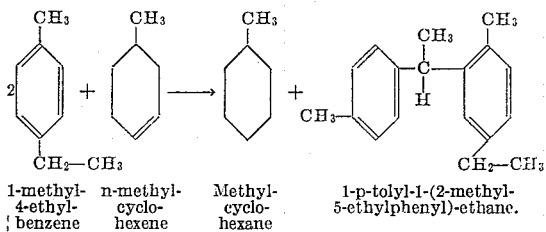

1-methyl-4-ethyl-benzene   n-methyl-cyclo-hexene   Methyl-cyclo-hexane   1-p-tolyl-1-(2-methyl-5-ethylphenyl)-ethane.

Hydrogenation of the 1-p-tolyl-1-(2-methyl-5-ethylphenyl)-ethane in the presence of a nickel catalyst or other active hydrogenation catalyst produces 1-(4-methylcyclohexyl)-1-(2-methyl-5-ethylcyclohexyl)-ethane.

Hydrogen transfer between 1-methyl-4-n-propylbenzene and a branched-chain olefin such as methylcyclohexene takes place according to the following equation to form 1-p-tolyl-1-(2-methyl-5-n-propylphenyl)-propane:

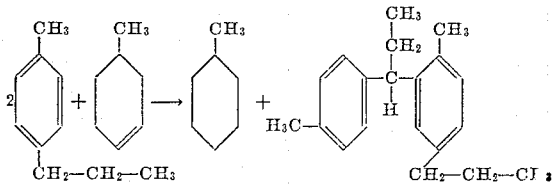

Catalytic hydrogenation of the above-indicated product, namely, 1-p-tolyl-1-(2-methyl-5-n-propylphenyl)-propane produces 1-(4-methylcyclohexyl) - 1 - (2 - methyl - 5 - n - propylcyclohexyl)propane.

A similar hydrogen transfer reaction occurs when p-isobutyl-toluene and a branched-chain olefin such as 4-methylcyclohexene are reacted in the presence of substantially anhydrous hydrogen fluoride and also in the presence of concentrated sulfuric acid. The reaction which thus occurs and which results in the production of a diarylalkane is represented by the following equation:

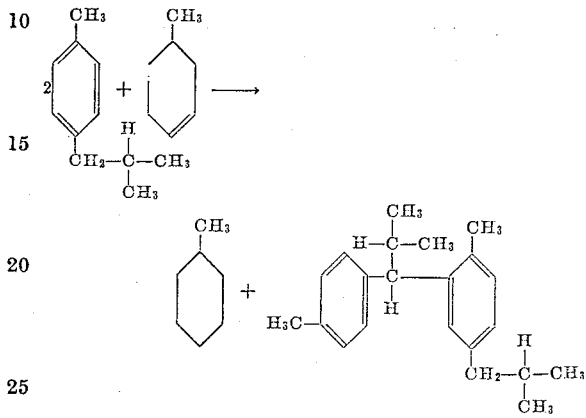

The product of this hydrogen transfer reaction is 1-p-tolyl-1-(2-methyl-5-isobutylphenyl)-2-methylpropane, its properties being substantially the same as those of the compound prepared synthetically.

The hydrogen transfer step of this process differs from the reactions obtained by treating similarly a branched-chain olefin and an aromatic hydrocarbon having two hydrocarbon radical substituents in para positions to each other and in which each of these radicals has only one or no replaceable hydrogen atom combined with the alpha carbon atom (that is, the carbon atom that is joined to the aromatic ring) and the aromatic hydrocarbon contains a replaceable nuclear hydrogen atom bound to an adjacent carbon atom of the aromatic ring. When the mentioned hydrocarbon radical of the aromatic hydrocarbon has only one alpha hydrogen atom, a hydrogen transfer and a condensation occur on contacting the aromatic hydrocarbon and a branched-chain olefin in the presence of an acid-acting catalyst to produce an indan hydrocarbon and to convert the branched-chain olefin into a branched-chain saturated hydrocarbon. If the aromatic hydrocarbon being reacted with a branched-chain olefin has no replaceable hydrogen atom combined with the alpha-carbon atom of a hydrocarbon radical substituent, that is, if the substituent radical is a tertiary hydrocarbon group, such an aromatic hydrocarbon and a branched-chain olefin in the presence of an acid-acting catalyst undergo an alkyl transfer reaction, but do not give a hydrogen transfer reaction. Thus 1-methyl-4-tertiary-butylbenzene and methylcyclohexene react in the presence of an acid-acting catalyst to form 1-methyl-2,4-ditertiary butylbenzene and 1-methyl-4-(methylcyclohexyl)-benzene.

The aromatic hydrocarbon used in this process must contain at least one para-arrangement of hydrocarbon radical substituents in order to give the hydrogen transfer reaction and yield a diarylalkane. Also one of the substituents in the para arrangement must contain only two hydrogen atoms combined with the carbon atom that is joined to the aromatic ring. Of such aromatic hydrocarbons suitable for the process, the benzene hydrocarbons may be represented by the formula:

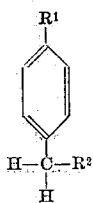

wherein each of $R^1$ and $R^2$ is selected from the group consisting of an alkyl radical, a cycloalkyl radical, a cycloalkalkyl radical, and a bicycloalkyl radical. The combination of the different R groups should be balanced so as to avoid steric hindrance. Also aromatic hydrocarbons and particularly benzene hydrocarbons containing more than three hydrocarbon substituent groups may also be present in an aromatic hydrocarbon charging stock provided that about 50 mole per cent of the aromatic hydrocarbons have a replaceable hydrogen atom combined with a nuclear carbon atom. Thus the present process can utilize a highly alkylated benzene, such as pentaethylbenzene for producing 1-tetraethylphenyl-1-(2,3,4,5,6-pentaethylphenyl)-ethane or even a mixture of about equal molecular proportions of hexaethylbenzene and pentaethylbenzene for producing 1-pentaethylphenyl-1-(2,3,4,5,6-pentaethylphenyl)-ethane, the latter compound being hydrogenatable to 1,1-di(pentaethylcyclohexyl)-ethane.

Suitable aromatic hydrocarbon starting materials include particularly 1-methyl-4-ethylbenzene, 1-methyl-4-n-propylbenzene, 1,4-diethylbenzene, 1,4-di-n-propylbenzene, etc.

Olefinic starting materials suitable for this hydrogen transfer process have branched chains and include such hydrocarbons as trimethylethylene, dihydrolimonene, methylcyclohexene, 1,1,3-trimethylcyclohexene, menthene, a bicycloolefin such as camphene, etc. The exact type of olefins to be used is dependent on the catalyst and the aromatic hydrocarbon with which the hydrogen transfer is to be effected. Thus n-octene and cyclohexene, namely, olefins not possessing branched chains, when reacted with a para-dialkylaromatic at operating conditions similar to those used with the branched-chain olefins, effect alkylation but not hydrogen transfer.

In addition to the branched-chain monoolefins mentioned above, other olefin-acting compounds which are also utilizable in this process comprises conjugated diolefins containing a tertiary carbon atom, alcohols, ethers, esters of carboxylic acids, tertiary alkyl phenols and alkyl halides which may be regarded as capable of forming branched-chain olefins in situ in the reaction mixture.

The hydrogen transfer step of the process as herein described is carried out in the presence of an acid-acting catalyst which may also be referred to as an alkylating catalyst or an acid-acting alkylating catalyst at conditions suitable for the hydrogen transfer reaction. These catalysts include mineral acids such as sulfuric acid, chlorosulfonic acid, fluorosulfonic acid, hydrogen fluoride, hydroxyborofluoric acids, fluorophosphoric acids, phosphoric acids, hydrogen fluoride with boron trifluoride, and Friedel-Crafts halide catalysts, particularly aluminum chloride, aluminum bromide, ferric chloride, zirconium chloride, and boron fluoride the latter preferably with hydrogen fluoride. Since in some cases, Friedel-Crafts catalysts may cause an alkyl migration within the aromatic ring before the hydrogen transfer reactions occur, it is sometimes advantageous to use Friedel-Crafts complexes, such as etherate, alcoholate, etc., for this reaction.

Phosphoric acid catalyst comprises orthophosphoric acid and also polyphosphoric acids such as pyrophosphoric acid, triphosphoric acid, and tetraphosphoric acid. Under certain conditions of operation various acid-acting, oxide-type catalysts may be used which include activated clays, silica-alumina composites, and other silica-containing materials which are generally utilizable as catalysts for hydrocarbon cracking.

The operating conditions used in the hydrogen transfer step of this process are dependent upon the nature of the hydrocarbons being treated and also upon the catalysts employed. When utilizing strong mineral acids, such as hydrogen fluoride, sulfuric acid, a halosulfonic acid as fluorosulfonic acid or chlorosulfonic acid, and the like, and also Friedel-Crafts metal halides promoted by a hydrogen halide such as hydrogen chloride, the process is carried out at a temperature of from about −30° to about 100° C. and at a pressure up to about 100 atmospheres. However, in the presence of hydrogen fluoride, sulfuric acid, and aluminum chloride catalysts the preferred operating temperature is preferably from about 0° to about 50° C., while in contact with ferric chloride catalyst the preferred operating temperature is from about 50° to about 100° C. Silica-alumina and other synthetic oxide catalysts and clays are generally used at a temperature of from about 200° to about 400° C., and at a superatmospheric pressure generally not in excess of about 100 atmospheres.

The hydrogen transfer reaction is carried out in either batch or continuous type of operation. In batch-type operation the usual procedure consists in placing a mineral acid or Friedel-Crafts catalyst and a portion, generally about 50%, of the aromatic hydrocarbon in a reactor provided with a mechanically driven stirrer, cooling these materials to a temperature of from about 0° to about 10° C. and adding thereto with stirring, a solution of the branched-chain olefin in the remainder of the aromatic hydrocarbon, while the temperature is maintained at a temperature of not more than 100° C. The reaction mixture is then separated and the product is washed, dried, and distilled to recover therefrom the diaryl alkane hydrocarbons. Unconverted aromatic hydrocarbons recovered in this distillation are utilizable in the further operation of the process.

The first step of the process is also carried out in a continuous manner by passing the aromatic and cycloolefinic hydrocarbon or other branched-chain olefin through a suitable reactor in which they are contacted in the presence of the catalyst, the latter either as a liquid or as a solid, depending upon the catalyst employed in the process. When using mineral acid catalysts such as sulfuric acid, chlorosulfonic acid, or hydrogen fluoride, this catalytic material is introduced continuously to the reactor which is provided with suitable mixing means and the resultant product is then separated into a hydrocarbon layer and a catalyst layer, the latter being returned to further use in the process while the hydrocarbon layer is washed, dried, and distilled as hereinabove set forth. When a solid catalyst such as silica-alumina, clay, or a supported Friedel-Crafts type catalyst is used as a fixed bed in the reactor and the aromatic and cycloolefinic hydrocarbons are passed therethrough, the resultant hydrocarbon product requires no washing and drying treatment and may be distilled to separate therefrom unconverted aromatic and cycloolefinic hydrocarbons and to recover the desired diarylalkane hydrocarbons.

In order to obtain relatively high yields of diarylalkane hydrocarbons by hydrogen transfer, it is necessary to use rather carefully selected hydrocarbon fractions as charging stocks. As already indicated herein, only certain types of aromatic hydrocarbons, namely, those containing particular substituents and readily replaceable nuclear hydrogen atoms are utilizable as starting materials to produce diarylalkane hydrocarbons. Thus 1-methyl-4-ethylbenzene and related alkylbenzene hydrocarbons react readily with branched-chain olefins to form a diphenylalkane and a saturated hydrocarbon, the latter having substantially the same carbon skeleton as that of the olefinic hydrocarbon charged to the process. An aromatic hydrocarbon which does not contain the aforementioned hydrocarbon radical substituents in para positions to each other does not react with a branched-chain olefin to give the desired hydrogen transfer reaction. Also an olefin which does not have a branched-chain structure such as is present in trimethylethylene, dihydrolimonene, methylcyclopentene, methylcyclohexene, etc., acts as an alkylating agent for the aromatic hydrocarbon also charged to the process. Accordingly, in order to obtain hydrogen transfer reaction rather than alkylation, it is necessary to use a branched-chain olefinic hydrocarbon together with a disubstituted benzene hydrocarbon or other disubstituted aryl hydrocarbon in which substituents are in para positions to each other and one of said substituents comprises an ethyl group, a normal propyl group, or other hydrocarbon groups in which two and only two hydrogen atoms are combined with the carbon atom adjacent to the aromatic nucleus, that is, the carbon atom in alpha position to the aromatic ring.

The diarylalkane hydrocarbons formed by the methods indicated above are hydrogenated catalytically in the presence of an active hydrogenation catalyst such as a reduced composite of nickel and diatomaceous earth, nickel supported by alumina, Raney nickel, also cobalt, palladium and platinum or these materials supported by a suitable carrier such as diatomaceous earth, alumina, etc. The hydrogenation treatment is generally carried out at a temperature of from about 150° to about 400° C. and preferably at a superatmospheric pressure generally not in excess of about 200 atmospheres. Also other active hydrogenation catalysts may be used to promote the conversion of these diarylalkane hydrocarbons and particularly of di(alkylphenyl)-alkane hydrocarbons into di(cycloalkyl)alkane and di(alkylcyclohexyl)alkane hydrocarbons.

The di(cycloalkyl)alkane hydrocarbons and di(alkylcyclohexyl)alkane hydrocarbons formed by this process are useful as transformer oils and as additives or blending agents in the production of certain lubricating oils.

The hydrocarbon, 1-p-tolyl-1-(2-methyl-5-isobutylphenyl)-2-methylpropane which results from the hydrogen transfer reaction between para-isobutyltoluene and methylcyclohexene was also synthesized by the following combination of steps in which p-isobutyltoluene was reacted with bromine at 0° C. to form 2-methyl-5-isobutylbromobenzene which was then reacted with p-isobutyryltoluene in the presence of magnesium and ether by the Grignard reaction to form para-methyl-isobutyrophenone and a tert-carbinol, namely, 1-p-tolyl-1-(2-methyl-5-isobutylphenyl)-2-methylpropanol. Dehydration of this tert-carbinol to the corresponding olefinic hydrocarbon was effected by passing a cyclohexane solution of the carbinol over activated alumina at a temperature of 290° C. The resultant olefin, 1-p-tolyl-1-(2-methyl-5-isobutylphenyl)-2-methyl-1-propene was hydrogenated in the presence of platinum oxide in glacial acetic acid solution to form 1-p-tolyl-1-(2-methyl-5-isobutylphenyl)-2-methylpropane. The latter compound was then reacted with hydrogen at a temperature of 200° C. and at a pressure of 100 atmospheres in the presence of a nickel-diatomaceous earth catalyst to produce 1-(4-methylcyclohexyl)-1-(2-methyl-5-isobutylcyclohexyl)-2-methylpropane which distilled at a temperature of 140° to 142° C. at 3 mm. pressure and had $n_D^{20}$, 1.4825; $d_4^{20}$, 0.8833; $MR_D$ calcd. 99.8, obs. 98.9

Anal. calcd. for $C_{22}H_{42}$ _____ C, 86.18; H, 13.82
Found _____ C, 86.17; H, 13.67

The following example is given to illustrate the present invention, although these data are not introduced with the intention of restricting unduly the generally broad scope of the invention.

p-Isobutyltoluene 296 g. (2 M.) and 96 g. (1 M.) of 4-methylcyclohexene were reacted at 0°–5° C. in the presence of 200 g. of anhydrous hydrogen fluoride in a reactor provided with stirring. The hydrocarbon products were washed with water to remove hydrogen fluoride and were then dried and separated by distillation on a 15–20 plate column at a reflux ratio of 10 to 1 into the following fractions:

| Fraction Number | Boiling Point— | | $n_D^{20}$ | Grams |
| --- | --- | --- | --- | --- |
| | °C. | at mm. | | |
| 1 | 102 | 760 | 1.4247 | 31 |
| 2 | 96–97 | 32 | 1.4880 | 158 |
| 3 | 96–105 | 4 | 1.4840 | 10 |
| 4 | 128–131 | 3 | 1.5200 | 64 |
| 5 | 148–150 | 3 | 1.5360 | 83 |
| 6 | 150–200 | 3 | 1.5310 | 11 |
| 7 | Residue | | | 5 |

Fraction 1 was methylcyclohexane and Fraction 2 was p-iso-butyltoluene.

Fraction 3 corresponded to dimethyldicyclohexyl, $d_4^{20}$, 0.8855; $MR_D$ calcd. 62.4, obs. 63.1.

Anal. calcd. for $C_{14}H_{26}$ _____ C, 86.51; H, 13.49
Found _____ C, 87.17; H, 13.17

Fraction 4 corresponded to methylcyclohexyl-p-isobutyltoluene, $d_4^{20}$, 0.9334; $MR_D$ calc. 79.5, obs. 79.9.

Anal. calcd. for $C_{18}H_{28}$ _____ C, 88.44; H, 11.56
Found _____ C, 89.09; H, 11.23

Fraction 5 corresponded to 1-p-tolyl-1-(2-methyl-5-isobutylphenyl)-2-methylpropane, $d_4^{20}$, 0.9322, $MR_D$ calcd. 97.6, obs. 98.3.

Anal. calcd. for $C_{22}H_{30}$ _____ C, 89.73; H, 10.27
Found _____ C, 89.89; H, 10.10

Hydrogenation of 10 g. (0.034 M.) of Fraction 5 at 180° C. in the presence of 1 gram of nickel-diatomaceous earth catalyst at an initial pressure of 123 atms. resulted in the consumption of 0.214 mole of hydrogen. The product distilled at 140–144° C. at 3 mm.; $n_D^{20}$, 1.4795; $d_4^{20}$, 0.8749, $MR_D$ calcd. 99.8, obs. 99.5.

Anal. calcd. for $C_{22}H_{42}$ _____ C, 86.18; H, 13.82
Found _____ C, 86.17; H, 13.67

These physical properties and analytical results corresponded closely to those possessed by synthetically prepared 1-(4-methyl-cyclohexyl)-1-(2 - methyl - 5 - isobutylcyclohexyl) - 2 - methylpropane.

We claim as our invention:

1. A process for producing a di(cycloalkyl)-alkane hydrocarbon which comprises hydrogenating in the presence of a hydrogenation catalyst and at a temperature of from about 150° to about 400° C. and a pressure of from substantially atmospheric to about 200 atmospheres a diarylalkane hydrocarbon represented by the formula

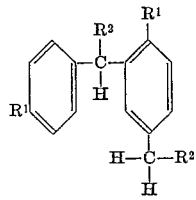

wherein each of $R^1$ and $R^2$ is selected from the group consisting of an alkyl radical, a cycloalkyl radical, a cycloalkalkyl radical, and a bicycloalkyl radical.

2. The process defined in claim 1 further characterized in that said catalyst comprises nickel.

3. The process defined in claim 1 further characterized in that said hydrogenation catalyst comprises a nickel-diatomaceous earth composite.

4. The process defined in claim 1 further characterized in that said hydrogenation catalyst comprises a composite of freshly reduced nickel supported by alumina.

5. The process defined in claim 1 further characterized in that said hydrogenation catalyst comprises platinum on alumina.

6. A process for producing a 1-(4-methylcyclohexyl) - 1 - (2 - methyl - 5 - alkylcyclohexyl)-2-methylpropane which comprises hydrogenating a 1-p-tolyl-1-(2-methyl-5-alkylphenyl)-2-methylpropane in the presence of a hydrogenation catalyst and at a temperature of from about 150° to about 400° C. and a pressure of from substantially atmospheric to about 200 atmospheres.

7. A 1,1-di(alkylcyclohexyl)alkane in which one of the cyclohexyl groups has one more alkyl substituent than the other.

8. 1 - (4 - methylcyclohexyl) - 1 - (2 - methyl-5-isobutylcyclohexyl)-2-methylpropane.

9. 1 - (4 - methylcyclohexyl) - 1 - (2 - methyl-5-ethylcyclohexyl)-ethane.

10. 1 - (4 - methylcyclohexyl) - 1 - (2 - methyl-5-n-propylcyclohexyl)propane.

11. A di(alkylcyclohexyl)alkane hydrocarbon represented by the formula

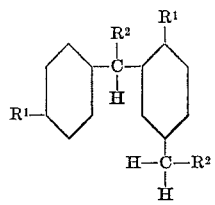

wherein each of $R^1$ and $R^2$ is selected from the group consisting of an alkyl radical, a cycloalkyl radical, a cycloalkalkyl radical, and a bicycloalkyl radical.

VLADIMIR N. IPATIEFF.
HERMAN PINES.

REFERENCES CITED

The following references are of record in the file of this patent:

UNITED STATES PATENTS

| Number | Name | Date |
|---|---|---|
| 1,965,956 | Dunkel et al. | July 10, 1934 |
| 2,101,104 | Smith et al. | Dec. 7, 1937 |
| 2,526,896 | Ipatieff et al. | Oct. 24, 1950 |

OTHER REFERENCES

Ipatieff et al., Jour. Amer. Chem. Soc., vol. 70, pp. 2123–28 (1948).

Sabatier et al., Comptes rendu, vol. 155, pp. 385–88 (1912).